United States Patent [19]

Umemura et al.

[11] Patent Number: 4,681,927

[45] Date of Patent: Jul. 21, 1987

[54] PROCESS FOR PRODUCING OXYMETHYLENE COPOLYER

[75] Inventors: Toshikazu Umemura, Takarazuka; Isamu Masumoto; Yukihiro Iha, both of Yokkaichi, all of Japan

[73] Assignee: Mitsubishi Gas Chemical Company, Inc., Tokyo, Japan

[21] Appl. No.: 866,959

[22] Filed: May 27, 1986

[30] Foreign Application Priority Data

May 29, 1985 [JP] Japan .................................. 60-116290

[51] Int. Cl.$^4$ .......................... C08G 2/10; C08G 2/16
[52] U.S. Cl. .................................... 528/232; 528/241; 528/270
[58] Field of Search ........................ 528/232, 241, 270

[56] References Cited

U.S. PATENT DOCUMENTS

| | | | |
|---|---|---|---|
| 4,115,369 | 9/1978 | Sugio et al. ............................ | 526/65 |
| 4,339,569 | 7/1982 | Sugio et al. .......................... | 528/240 |
| 4,412,067 | 10/1983 | Amann et al. ....................... | 528/232 |
| 4,431,794 | 2/1984 | Sadlowski et al. .................. | 528/232 |

FOREIGN PATENT DOCUMENTS 2753218  6/1978  Fed. Rep. of Germany .

*Primary Examiner*—Lucille M. Phynes
*Attorney, Agent, or Firm*—Wenderoth, Lind & Ponack

[57] ABSTRACT

A process for producing an oxymethylene copolymer by copolymerizing trioxane with at least one cyclic comonomer selected from the group consisting of cyclic ethers and cyclic formals, said process comprising
(1) polymerizing trioxane alone or with a cyclic comonomer in the presence of a polymerization catalyst until the conversion of trioxane reaches 10 to 95%, and
(2) thereafter adding a cyclic comonomer and a polymerization catalyst to the reaction system and continuing the polymerization.

10 Claims, No Drawings

PROCESS FOR PRODUCING OXYMETHYLENE COPOLYER

This invention relates to a process for producing an oxymethylene copolymer by the copolymerization of trioxane. More specifically, this invention relates to a process for producing a crude oxymethylene copolymer having a small content of an unstable portion.

It is known to produce an oxymethylene copolymer by copolymerizing trioxane with a cyclic ether or formal using a Lewis acid catalyst typified by boron trifluoride. Trioxane and the cyclic ether or formal as a comonomer are mixed at the start of the polymerization reaction. The reaction mechanism is believed to be that first, the polymerization of the comonomer proceeds, and thereafter while trioxane polymerizes, the polymer of the comonomer is depolymerized, and consequently, trioxane and the comonomer are copolymerized. The resulting crude oxymehylene copolymer has a thermally unstable trioxane polymer portion at the end of its molecular chain, and therefore cannot be used as it is in pratical applications.

It is the practice therefore to remove the unstable portion and stabilize the copolymer by, for example, adding a mixture of water and an alcohol containing a basic substance as a hydrolyzing agent and hydrolyzing the copolymer in the solvent at 140° to 220° C.; or melt-kneading a mixture of the crude oxymethylene copolymer and a solvent to heat-stabilize the copolymer; or adding a heat stabilizer to the crude oxymetheyne copolymer, and melting the copolymer at a temperature ranging from its melting point to a temperature 100° C. higher than the melting point to decompose the unstable portion. In any case, according to the above process, the unstable portion becomes a loss. Furthermore, since the treatment of the crude oxymethylene copolymer having a large amount of the unstable portion is time-consuming, the treating equipment must be large-sized, or the quality of the copolymer is degraded.

The amount of the unstable portion is usually expressed by the base unstability, that is, the decomposition rate of the crude oxymethylene copolymer which is determined when about 2.5 g of the crude oxymethylene copolyme is accurately weighed and heat-treated in 25 ml of benzyl alcohol containing 1% by volume of t-n-butylamine at 160° C. for 2 hours.

Where the molecular weight of the oxymethylene copolymer is constant, the base unstability tends to become lower as the amount of the comonomer used becomes larger. On the other hand, if the amount of the comonomer used is large, the melting point or mechanical strength of the resulting oxymethylene copolymer is reduced. The amount of the comonomer that can be used is limited to not more than 0.20 mole %, more preferably not more than 0.10 mole %, per mole of trioxane.

Some cyclic ethers and formals cannot be copolymerized with trioxane by conventional methods because they greatly lower the rate of initial polymerization reaction.

For the foregoing reasons, it is difficult by conventional methods to produce a crude oxymethylene copolymer having an intrinsic viscosity, measured in p-chlorophenol at 60° C., of 1.40 to 1.50 dl/g and a base unstability of not more than 5% by weight by using the comonomer in an amount of not more than 0.1 mole per mole of trioxane. In particular, it is at least extremely difficult to obtain a base unstability of not more than 5% by weight when the polymerization is carried out until the proportion of the unreacted trioxane becomes not more than 5%.

It is an object of this invention to provide a process for producing a crude oxymethylene copolymer having a low base unstability by relatively decreasing the amount of a cyclic comonomer used.

Another object of this invention is to provide a process for producing a crude oxymethylene copolymer having a low base unstability even when the conversion of trioxane reaches at least 60%.

Further obejcts of this invention along with its advantages will become apparent from the following description.

According to this invention, the objects and advantages of the invention are achieved by a process for producing an oxymethylene copolymer by copolymerizing trioxane with at least one cyclic comonomer selected from the group consisting of cyclic ethers and cyclic formals, said process comprising (1) polymerizing trioxane alone or with a cyclic comonomer in the presence of a polymerization catalyst until the conversion of trioxane reaches 10 to 95%, and (2) thereafter adding a cyclic comonomer and a polymerization catalyst to the reaction system and continuing the polymerization.

In step (1) of the process of this invention, trioxane alone or with the cyclic comonomer is polymerized until the conversion of trioxane reaches 10 to 95%, and then in step (2), the cyclic comonomer and the polymerization system are added.

The reaction mixture in which the conversion of trioxane is less than 10% is a liquid or slurry. When the cyclic comonomer and the polymerization catalyst are added at this stage, the result does not substantially differ from that obtained by a conventional method in which they are added at the start of polymerization. On the other hand, when the cyclic comonomer and the polymerization catalyst are added to the reaction mixture in which the conversion of trioxane exceeds 95%, abrupt depolymerization occurs to reduce the molecular weight of the resulting oxymethylene copolymer. Furthermore, the thermal stability of the oxymetheyne copolymer as a whole is markedly reduced because of the formation of some low-molecular-weight oxymethylene copolymer at this time.

The suitable amount of the cyclic comonomer [the total amount of the comonomers used in steps (1) and (2)] is 0.02 to 0.2 mole, preferably 0.04 to 0.1 mole, per mole of trioxane in order to obtain finally a molding material having excellent thermal stability and a balanced combination of mechanical strengths. Part or the whole of the cyclic comonomer, preferably at least 25%, more preferably at least 25 to 50%, of the cyclic comonomer, is added during the polymerization reaction, namely in step (2).

The amount of the polymerization catalyst cannot be determined generally because it may vary depending upon the molecular weight of the desired oxymethylene copolymer, the amount of the reaction solvent used, the amount of the cyclic comonomer used, etc. Usually, the suitable amount of the polymerization catalyst is 0.01 to 0.5 millimole per mole of trioxane. Part of the polymerization catalyst, preferably 25 to 50% of the polymerization catalyst, is added during the reaction, i.e. in step (2), together with the cyclic comonomer.

When all of the polymerization catalyst is added to the reaction system in step (1) and only the comonomer is added during the polymerization in step (2), the cyclic comonomer added in step (2) is not incorporated in the oxymethylene copolymer.

The cyclic comonomer and the polymerization catalyst added at the start of the polymerization reaction may not always be the same as those added during the polymerization reaction. They may be different in kind from each other.

Preferably, in step (2) the comonomer and the polymerization catalyst are added in the form of a mixture obtained by mixing the comonomer with the polymerization catalyst or a solution of it in an inert solvent at $-50°$ to $20°$ C. Especially preferably, the premixing temperature is maitnained at $-20°$ to $0°$ C.

The premixing in the batchwise process is carried out by charging the components into a vessel having an agitator. The premixture may be withdrawn from this vessel and added to the reaction mixture. When the polymerization reaction is carried out in a reactor adapted for continuous operation, the cyclic comonomer and the catalyst are mixed by a static mixer having an external cooling jacket and the premixture may be directly added to the reaction mixture.

If the pre-mixing temperature for the comonomer and the polymerization catalyst is less than $-50°$ C., the pre-mixture sometimes becomes a jelly-like viscous mass and is difficult to handle. On the other hand, when the pre-mixing temperature exceeds $20°$ C., homopolymerization of the comonomer occurs vigorously, and the pre-mixture may become a gel which is also difficult to handle.

The comonomer and the polymerization catalyst need not always be added at a time in step (2). They may be added in two or more portions.

The polymerization is continued after the addition of the comonomer and the polymerization catalyst in step (2). As a result, the conversion of trioxane is increased and the desired copolymer can be obtained.

The final conversion of trioxane may be selected depending upon the methods of purification and stabilization of the crude copolymer, and cannot generally be determined. Preferably, the final conversion is at least 60%. If it is less than 60%, much monomers are lost and the process is considered as non-practical. Since in the process of this invention, the catalyst added during the reaction causes the polymerization reaction of trioxane to proceed, the crude copolymer can be obtained at a high final conversion. For example, in a bulk polymerization method in which a reaction solvent is not substantially used, after the conversion of trioxane in step (1) has reached 10 to 95%, preferably 20 to 60%, the whole or remainder of the comonomer and the remainder of the polymerization catalyst are added to the reaction system and the polymerization is carried out further. At this time, it is advantageous that the final conversion of trioxane is adjusted to at least 95%, especially at lest 99%, so as to obviate substantially a step of recovering the monomers.

The suitable polymerization reaction temperature in steps (1) and (2) is $0°$ to $120°$ C., especially $50°$ to $110°$ C.

The process of this invention can be carried out by solution polymerization involving the use of a solvent inert to the polymerization reaction in an amount 1.0 to 10.0 times the weight of trioxane. Examples of the inert solvent include aliphatic hydrocarbons such a hexane, heptane and cyclohexane, aromatic hydrocarbons such as benzene, toluene and xylene and halogenated hydrocarbons such as methylene dichloride and ethylene dichloride.

The process of this invention may also be carried out by bulk polymerization in which such an inert solvent is not substantially used or is used in an amount of not more than 10% by weight based on trioxane.

The process of this invention is especially effective for the production of an oxymethylene copolymer by bulk polymerization in the substantial absence of an inert solvent until the final conversion of trioxane exceeds 95%.

The polymerization reaction may be carried out batchwise or continuously.

The present inventors previously proposed a process for producing a homopolymer or copolymer of oxymethylene continuously by using a special reaction device consisting at least of a first-stage reactor and a second-stage reactor, in which the reaction product containing 30 to 60% by weight of the unreacted matter is taken out as a powder from the first-stage reactor and introduced into the second-stage reactor, and a polymerization product which contains not more than 5% by weight of the unreacted matter and whose polymerization has been substantially completed is taken out as a powder (U.S. Pat. No. 4,115,369 and German Laid-Open Patent Application No. 2753218). The first-stage reactor comprises a barrel having an external heating or cooling jacket for the reaction mixture and within the barrel, at least two horizontal stirring shafts and a plurality of paddles fixed to the stirring shafts. The paddles have such a shape that at least one section of each paddle in a direction at right angles to the shafts has a plurality of linear symmetries with the axial center as a crossing point, and when the horizontal stirring shafts are rotated simultaneously in the same direction, the pointed ends of the paddles fixed to one of the horizontal stirring shafts, in a section at right angles to the shafts, always keep a slight clearance from the inside surface of the barrel or the paddles fixed to the other horizontal stirring shaft. Downstream of the first-stage reactor is connected the second-stage reactor which is the same type of reactor as the first-stage reactor or a horizontal continuos mixture having a high heat transmission surface but no complete self-cleaning property.

The process of this invention can be carried out very conveniently in this multi-step continuous reaction method.

The description in the specification of this prior application which relates to the multi-step continuous reactor is cited herein as part of the description of the present invention.

Specifically, trioxane and the polymerization catalyst and optionally the comonomer are fed from the material feed opening of the first-stage reactor, and the polymerization is started. From its discharge opening, the reaction mixture with a predetermined conversion of trioxane is discharged. The comonomer and the catalyst which are pre-mixed by a static mixer are added from a chute connecting the discharge opening of the first-stage reactor to the second-stage reactor and fed to the second-stage reactor together with the reaction mixture from the first-stage reactor. In the second-stage reactor, the reaction is continued while maintaining the inside temperature at $0°0$ to $120°$ C., preferably $50°$ to $110°$ C.

The polymerization reaction is stopped by adding a stopper capable of deactivating the polymerization catalyst to the reaction system or by introducing the reaction product into a solvent containing the stopper.

The stopper may, for example, be an amine compound such as triethylamine or tributylamine diluted with an organic solvent, or an inorganic alkaline compound such as ammonia, sodium hydroxide, potassium hydroxide or calcium hydroxide as an aqueous solution. There may also be used a tertiary phosphine compound of the following general formula (II)

(II)

wherein $R_1$, $R_2$ and $R_3$ are identical or different and each represents a hydrocarbon group having 1 to 18 carbon atoms, which the present inventors previously proposed. When the tertiary phosphine compound is used as the stopper, it is not necessary to remove the deactivated catalyst by washing, and the resulting crude oxymethyene copolymer can be directly subjected to an operation of heat stabilization.

Examples of the cyclic ethers and cyclic formals as the comonomer used in this invention are compounds of the following general formula (I)

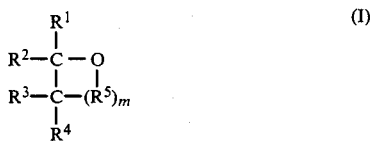
(I)

wherein $R^1$, $R^2$, $R^3$ and $R^4$ are identical or different and each represents a hydrogen atom, an alkyl group or a haloalkyl group, $R^5$ represents a methylene or oxymethylene group or an alkyl- or haloalkyl-substituted methylene or oxymethylene group in which case m represents an integer of 0 to 3, or a divalent group of the formula $+CH_2)_l-OCH_2-$ or $+O-CH_2-CH_2)_l-OCH_2-$ in which case m represents 1 and l represents an integer of 1 to 4.

Preferably, the alkyl group in formula (I) has 1 to 5 carbon atoms, and 1 to 3 hydrogen atoms of the alkyl group may be substituted by halogen atoms, particularly chlorine atoms.

Examples of suitable cyclic ethers include ethylene oxide, propylene oxide, epichlorohydrin, butene-1 oxide and styrene oxide. Examples of suitable cyclic formal include tetrahydrofuran, 1,3-dioxolane, 1,3-dioxepane and 1,3,6-trioxocan.

The polymerization catalyst may, for example, at least one of perchloric acid, or Lewis acids such as aluminum chloride, ferrous chloride, ferric chloride, boron trifluoride, boron trifluoride hydrate and coordination compounds of organic compounds having an oxygen or sulfur atom and boron trifluoride. Such a catalyst is used in the form of a gas or as a solution in a suitable solvent. Preferably, the polymerization catalyst is a coordination compound of boron trifluoride, particularly diethyl boron trifluoride etherate or dibutyl boron trifluoride etherate.

In an especially preferred embodiment of this invention, boron trifluoride etherate is used as the polymerization catalyst in step (1) and 0.01 to 0.1 mole of ethylene oxide is used as the cyclic comonomer per mole of trioxane. The polymerization in step (1) is carried out until the conversion of trioxane reaches 10 to 95%.

Subsequently, in step (2), a pre-mixture of boron trifluoride etherate and 0.01 to 0.05 mole, per mole of trioxane, of 1,3-dioxolane is added, and the polymerization is continued.

In the process of this invention, a chain transfer agent such as an alcohol, a carboxylic acid, a carboxylic acid anhydride, an ester, an amide, an imide, a phenol or an acetal compound may be used as a molecular weight controlling agent at the start of polymerization. Of these, phenol, 2,6-dimethylphenol, methylal and polyoxymethylene dimethoxide are preferred.

The mechanism of this invention is not entirely clear. It is believed however that according to this invention, the comonomer added during the reaction does not go through the step of polymerization-depolymerization but reacts with the polymer of trioxane and incorporated into the polymer chain to form a copolymer. The crude copolymer obtained by the process of this invention has a very low content of an unstable portion, and the loss of the polymer incident to the removal of the unstable portion can be reduced.

Since the polymerization catalyst is added stepwise in two or more portions in the process of this invention, the rate of the polymerization reaction can be controlled with time. Hence, the control of the reaction is much easier than in the case of adding all of the catalyst at the start of the reaction in the prior art.

The following Examples and Comparative Examples illustrate the present invention in greater detail. In these examples, the instrinsic viscosity, the base unstability and the rate of thermal decomposition in these examples were measured by the following methods.

Instrinsic viscosity [η]

Measured at 60° C. in p-chlorpenol containing 2% of alpha-pinene.

Base unstability (L)

About 2.5 g of the crude copolymer was precisely weighed, and heated at 160° C. for 2 hours in 25 ml of benzyl alcohol containing 1% by volume of tributylamine. The solution was precipitated, and the precipitated polymer was filtered, washed with acetone three times and dried in vacuum at 60° C. until its weight became constant. The dried polymer was precisely weighed. The base unstability is calculated from the following equation.

$$L = \frac{W_o - W_1}{W_o} \times 100(\%)$$

wherein $W_o$ is the weight (grams) of the sample before treatment, and $W_1$ is the weight (grams) of the sample after the treatment.

Rate of thermal decomposition (K)

About 1.5 g of the crude copolymer was precisely weighed and taken into a test tube, and then heated in air at 222° C. The weight of the copolymer after the lapse of 5, and 8 hours, respectively, was precisely measured. The rate of thermal decomposition was calculated from the following equation.

$$K = \frac{W_o - W_1}{W_o} \times 100(\%)$$

wherein $W'_0$ is the weight (grams) of the sample before heating, and $W'_1$ is the weight (grams) of the sample after heating.

EXAMPLE 1 and COMPARATIVE EXAMPLE 1

Trioxane (300 g) and 300 g of benzene were fed into a 1-liter kneader having two Z-type agitating blades, and heated to 60° C. Boron trifluoride etherate was added in an amount of 0.15 millimole per mole of trioxane, and the polymetrization was carried out. The polymerization system immediately became whitely turbid, and slurried. Thirty seconds after the addition of the catalyst, the conversion of trioxane reached 35%.

At this time, a mixture prepared from 0.08 millimole, per mole of trioxane of boron trifluoride etherate and 0.051 mole, per mole of trioxane, of 1,3-dioxaolane in a flask cooled at 0° C. was added to the polymerization system by a syringe. While the temperature of the inside of the kneader was maintained at 60° C., the polymerization was carried out for 120 minutes. Thereafter, 300 ml of a benzene solution of n-butylamine (10 moles per mole of the catalyst added) was added to stop the polymerization. On stoppage of the polymerization, the conversion of trioxane was 79.1%.

The polymerization product was taken out from the kneader, repeatedly washed with acetone, and dried in vacuum at 60° C. to form 250 g of a crude oxymethylene copolymer.

The resulting crude oxymethylene copolymer contains 5.0% by weight of a portion derived from the comonomer, and had an intrinsic viscosity [$\eta$] of 1.45 dl/g, and a base unstability of 11.5% by weight.

For comparison, all of the boron trifluoride etherate was added at the start of the reaction, and during the reaction, 0.051 mole, per mole of trioxane, of 1,3-dioxolane alone was added to the reaction mixture. Thereafter, the polymerization was continued at 60° C. for 120 minutes, and the stopper was added likewise to stop the polymerization. The reaction product was taken out, washed with acetone and dried. Upon stoppage of the polymerization, the conversion of trioxane was 39.6%. The resulting crude oxymethylene copolymer (185 g) contained 0.5% by weight of a portion derived from the comonomer, and had an intrinsic viscosity [$\eta$] of 1.73 dl/g and a base unstability of 68.5% by weight.

EXAMPLES 2-6 and COMPARATIVE EXAMPLES 2-4

Trioxane (300 g) and 0.040 mole, per mole of trioxane, of ethylene oxide were charged into the same reactor as used in Example 1, and heated to 60° C. Boron trifluoride etherate (0.05 millimole per mole of trioxane) was added to the solution, and the polymerization was started.

Cooling water was passed through the jacket of the reactor so that the polymerization temperature was maintained at 80° to 90° C.

When the conversion of trioxane in this reaction system reached each of the values shown in Table 1, a pre-mixture of each of the comonomers of the kinds and amounts shown in Table 1 and boron trifluoride etherate (catalyst) in the amount shown in Table 1 (see the column headed by "Composition during the polymerization") was added.

Thereafter, the reaction was carried out for 15 minutes while maintaining the reaction temperature at 80° to 90° C. Thereafter, a benzene solution of triphenylphosphine was added in an amount of 2 moles per mole of the added catalyst, and the temperature of the inside of the reactor was lowered to 0° C. to stop the polymerization.

The conversion of trioxane on stoppage of the polymerization was as shown in Table 1.

The resulting crude oxymethyene copolymer was pulverized by a mixer to a size passing through a 20-mesh seive, and dried in vacuum.

The base unstability and intrinsic vioscosity of the dried crude oxymethylene copolymer were measured, and the results are shown in Table 1.

To the dried crude oxymethylene copolymer were added 0.5% by weight of tetrakis[methylene-(3,5-di-t-butyl-hydroxyhydrocinnamate)]methane and 0.2% by weight of melamine, and they were melt-kneaded at 220° C for 15 minutes in an atmosphere of nitrogen gas to heat-stabilize the copolymer. After stabilzation, the rate of thermal decomposition of the copolymer was measured, and the results are shown in Table 1.

For comparison, the above procedure was repeated except that all of the comonomer and catalyst used were added at the start of the reaction (Comparative Example 2); the comonomer and the catalyst were additionally charged after the conversion of trioxane exceeded 95% (Comparative Example 3); and the comonomer and the catalyst were additionally charged into the reaction mixture which as a viscous liquid with a trioxane conversion of less than 10%. The results are also shown in Table 1.

TABLE 1

| | Composition at the start | | Composition during the polymerization | | | Final | | | | |
|---|---|---|---|---|---|---|---|---|---|---|
| | Amount of the comonomer (moles) | Amount of the catalyst (millimole) | Comonomer Kind | Amount (moles) | Amount of the catalyst (millimole) | Conversion of the trioxane (%) | Conversion of the trioxane (%) | Results | | |
| | | | | | | | | L % | [$\eta$] dl/g | K-1 % | K-2 % |
| Example 2 | 0.040 | 0.050 | Ethylene oxide | 0.026 | 0.050 | 45 | 98.5 | 4.5 | 1.46 | 3.5 | 10.5 |
| Example 3 | 0.040 | 0.050 | Ethylene oxide | 0.026 | 0.050 | 75 | 98.5 | 4.8 | 1.48 | 4.1 | 10.8 |
| Example 4 | 0.040 | 0.050 | 1,3-Dioxolane | 0.026 | 0.050 | 50 | 99.7 | 2.5 | 1.40 | 2.9 | 9.5 |
| Example 5 | 0.040 | 0.050 | 1,3-Dioxolane | 0.026 | 0.050 | 85 | 99.8 | 6.8 | 1.41 | 3.0 | 9.8 |
| Example 6 | 0.040 | 0.050 | 1,3-Dioxolane | 0.026 | 0.050 | 75 | 99.5 | 4.5 | 1.43 | 4.3 | 11.0 |
| Comp. Ex. 2 | 0.060 | 0.100 | — | — | — | — | 97.5 | 9.5 | 1.45 | 5.8 | 14.5 |
| Comp. Ex. 3 | 0.040 | 0.050 | 1,3-Dioxolane | 0.026 | 0.050 | 98 | 79.8 | 13.5 | 1.23 | 9.5 | 47.0 |
| Comp. Ex. 4 | 0.040 | 0.050 | Ethylene | 0.026 | 0.050 | 8 | 97.8 | 97.8 | 1.43 | 6.2 | 15.6 |

TABLE 1-continued

| Composition at the start | | Composition during the polymerization | | | Final | | | | |
|---|---|---|---|---|---|---|---|---|---|
| Amount of the comonomer (moles) | Amount of the catalyst (millimole) | Comonomer Kind | Amount (moles) | Amount of the catalyst (millimole) | Conversion of the trioxane (%) | Conversion of the trioxane (%) | Results L % | [η] dl/g | K-1 % K-2 % |
| | | oxide | | | | | | | |

Note:
K-1 and K-2 represent the rate of thermal decomposition after heating for 5 and 8 hours, respectively.
The amount of the comonomer and the catalyst is per mole of trioxane.

EXAMPLE 7 and COMPARATIVE EXAMPLE 5

A continuous polymerization reaction apparatus consisting of a first-stage reactor and a second-stage reactor was used. The first-stage reactor was a mixer having a long jacketed case and a pair of shafts therein, each shaft having fitted therein many pseudo-triangular plates engaging each other, the pointed ends of the pseudo-triangular plates being adapted to clean the inside surface of the case and the other pseudo-triangular plates. The second-stage reactor directly connected to the first-stage reactor was a horizontal stirring device including a long jacketed case and a pair of shafts therein, each shaft having fixed thereto agitating blades having no self-cleaning property but being suitable for powder mixing. The inside surface of the case of e first-stage reactor had a diameter of 100 mm, and the inside surface of the case of the second-stage reactor had a diameter of 200 mm. To the second-stage reactor was directly connected the same type of horizontal agitating device in which a catalsyt deactivator was introduced so that it could be continuously mixed with the crude copolymer powder.

The first-stage reactor was charged with 40 kg/hr of trioxane, 0.030 mole, per mole of trixoane, of ethylene oxide, 0.06 millimole, per mole of trioxane, of boron trifluoride diethyletherate, and 0.1% by weight, based on trioxane, of 2,6-dimethylphenol as a molecular weight controlling agent. The catalyst and the molecular weight controlling agent were added as a benzene solution. The total amount of benzene was less than 1% by weight based on trioxane.

In the first-stage polymerization reactor, the reaction temperature was adjusted to 90° C. After a residence time of about 4 minutes, a copolymer powder with a trioxane conversion of 75% was discharged from the first-stage reactor.

A mixture obtained by pre-mixing at −10° C. by a static mixer 0.025 mole, per mole of trioxane, of 1,3-dioxolane and 0.04 millimole, per mole, of boron trifluoride diethyl etherate which had been fed by separate pumps from nozzle holes provided in a chute connecting the first-stage reactor and the second-stage reactor was continuously fed to the second-stage reactor together with the copolymer powder discharged from the first-stage reactor.

The reaction temperature in the second-stage mixer was maintained at 60° C., and the reaction mixture was transferred toward the discharge opening while being mixed gently until the polymerization was completed. The residence time in the second-stage reactor was about 20 minutes and the conversion of trioxane in the crude copolymer was 98%.

The copolymer powder was sent immediately to the stopper mixer, and a benzene solution of triphenyl phosphine was added in an amount of 2 moles per mole of the catalyst used in the polymerization to stop the polymerization reaction.

The crude copolymer was pulverized to a particle size passing through a 20-mesh sieve by a pulverizer.

The resulting crude oxymethylene copolymer had a base unstability of 2.6% by weight, and an intrinsic viscosity of 1.41 dl/g.

For comparison, the above procedure was repeated except that all the polymerization catalyst was fed to the first-stage reactor, and during the reaction, only 1,3-dioxolane was added to the reaction mixture from a nozzle hole provided in the chute between the reactors. As a result, the resulting crude oxymethylene copolymer had a base unstability of 11.5% by weight and an intrinsic viscosity of 1.68 dl/g.

What is claimed is:

1. A process for producing an oxymethylene copolymer by copolymerizing trioxane with at least one cyclic comonomer selected from the group consisting of cyclic ethers and cyclic formals, said process comprising
    (1) polymerizing trioxane alone or with a cyclic comonomer in the presence of a polymerization catalyst until the conversion of trioxane reaches 10 to 95%, and
    (2) thereafter adding a cyclic comonomer and a polymerization catalyst to the reaction system and continuing the polymerization.

2. The process of claim 1 wherein the total amount of the cyclic comonomers used in steps (1) and (2) is 0.02 to 0.2 mole per mole of trioxane, and at least 25% of the entire cyclic comonomers is added in step (2).

3. The process of claim 1 wherein the total amount of the polymerization catalysts used in steps (1) and (2) 0.01 to 0.5 millimoles per mole of trioxane, and 25 to 50% of the entire polymerization catalysts is added in step (2).

4. The process of claim 1 wherein the cyclic comonomer and the polymerization catalyst to be added in step (2) are premixed at a temperature of −50° C. to 20° C. before the addition.

5. The process of claim 1 wherein the cyclic comonomer is a compound represented by the following formula (1)

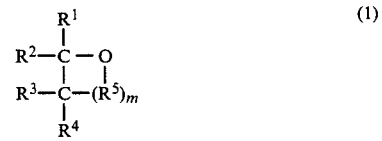

wherein $R^1$, $R^2$, $R^3$ and $R^4$ are identical or different and each represents a hydrogen atom, an alkyl group or a haloalkyl group, and $R^5$ represents a methylene group, an oxymethylene group or an alkyl- or haloalkyl-substituted methylene or oxymethylene group in which case m is an integer of from 0 to 3, or a divalent group of the formula $-(CH_2)_l-O-CH_2-$ or $-(O-CH_2-CH_2)_l-O-CH_2-$ in which case m is 1, and l is an integer of from 1 to 4.

6. The process of claim 1 wherein the cyclic comonomer is ethylene oxide, propylene oxide, epichlorohydrin, butene-1 oxide, styrene oxide, tetrahydrofuran, 1,3-dioxaolane, 1,3-dioxepan, or 1,3,6-trioxocane.

7. The process of claim 1 wherein the polymerization catalyst is boron trifluoride, boron trifluoride hydrate or a coordination compound of boron trifluoride.

8. The process of claim 1 wherein the polymerization reaction is carried out in not more than 10% by weight, based on trioxane, of an inert solvent.

9. The process of claim 1 wherein the polymerization was carried out by a bulk polymerization technique in the substantial absence of solvent until the conversion of trioxane exceeds 95%.

10. The process of claim 1 wherein in step (1), boron trifluoride etherate is used as the polymerization catalyst, 0.01 to 0.1 mole, per mole of trioxane, of ethylene oxide is used as the cyclic comonomer and the polymerization is carried out until the conversion of trioxane reaches 10 to 95%; and in step (2), a pre-mixture of 0.01 to 0.05 mole, per mole of trioxane, of 1,3-dioxolane and boron trifluoride etherate.

* * * * *